April 26, 1955 C. GERST 2,707,059
POWER LOADER AND SHOVEL
Filed Aug. 25, 1952 2 Sheets-Sheet 1

INVENTOR.
Chris Gerst.
BY
ATTORNEY.

April 26, 1955 C. GERST 2,707,059
POWER LOADER AND SHOVEL
Filed Aug. 25, 1952 2 Sheets-Sheet 2
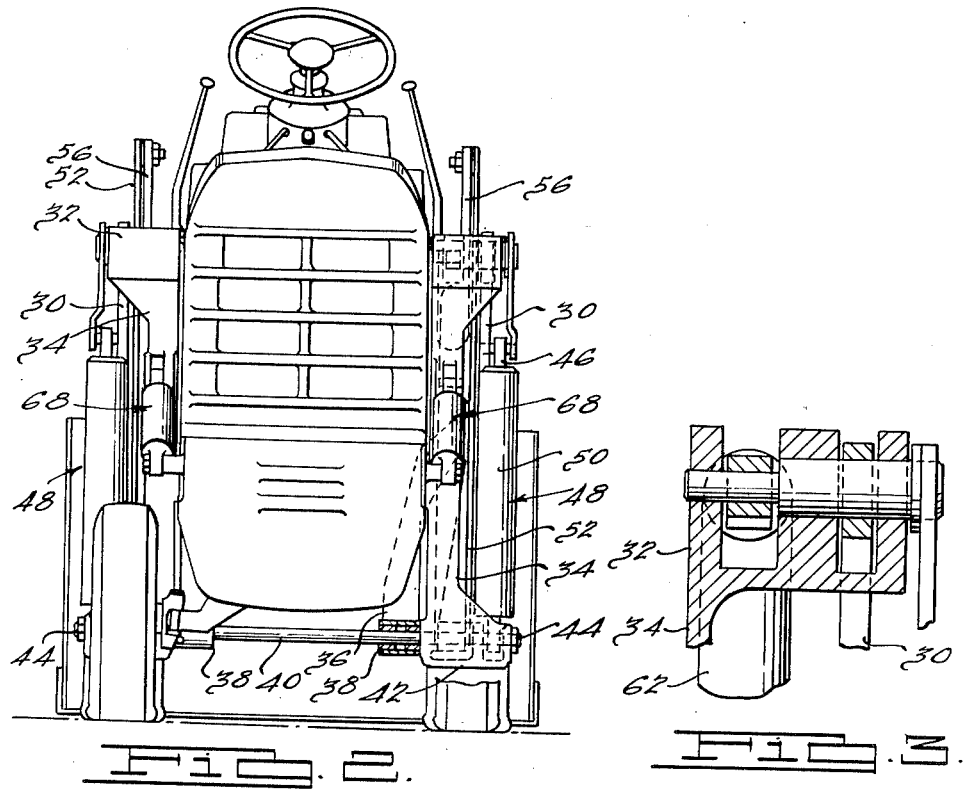
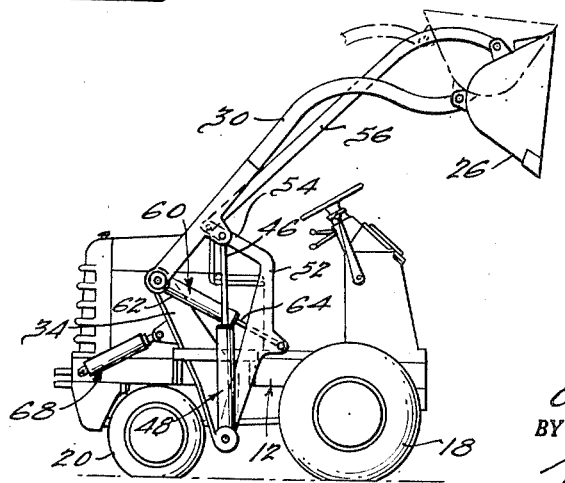
INVENTOR.
Chris Gerst.
BY
ATTORNEY.

United States Patent Office 2,707,059
Patented Apr. 26, 1955

2,707,059

POWER LOADER AND SHOVEL

Chris Gerst, Detroit, Mich., assignor, by mesne assignments, to Westinghouse Air Brake Company, a corporation of Pennsylvania Application August 25, 1952, Serial No. 306,193

3 Claims. (Cl. 214—140)

This invention relates in general to material handling apparatus and has particular reference to a tractor propelled power operated material handling device of the type in which a material handling member, such as a shovel, is mounted on the end of a power operated elevating and lowering lift arm which is pivotally connected to the tractor so as to be movable between loading, transporting and dumping positions thereof. A means is also provided for adjusting the angular position of the material handling member on the end of the lift arm and may comprise a power operated tilting lever pivotally mounted on the frame of the tractor and connected to the material handling member by a link means whereby the elevation of the material handling member and the tilting thereof may be independently controlled.

In material handling apparatus of the type described above, it is customary to load the material handling member, such as a shovel, by driving the tractor forwardly with the shovel in its loading position so that the shovel digs into the material to be handled. It has been found that on many occasions such loading operations do not result in a full loading of the shovel structure, either because of the character of the material to be handled or because the drive wheels of the tractor will spin when the shovel is driven into the load and before the shovel can become fully loaded.

In order to overcome the above disadvantages, and to provide a greatly improved and more efficient loading operation for apparatus of the type described, this invention contemplates the provision of a means for exerting a digging or loading thrust on the shovel structure independent of movement of the tractor toward the material to be handled.

In achieving such improved loading operation, the lift arm is pivotally connected to a supporting lever which is pivotally mounted on the frame of the tractor, and an actuating means such as a hydraulic piston and cylinder device connected to the tractor frame and to the supporting lever, is operable upon actuation thereof to pivot the supporting lever and thereby effect a longitudinal shifting of the lift arm and shovel structure supported thereby independently of movement of the tractor. In loading operation, the shovel may be driven into the material to be handled as far as possible by movement of the tractor and the hydraulic means then actuated to exert the final digging or loading thrust on the shovel to fully load the same.

The arrangement of the supporting lever and lift arm is such that the shovel structure may be moved into an extended position before being driven into the material to be handled and such arrangement would make possible use of the apparatus in certain instances in which the material to be handled would otherwise be inaccessible to the shovel because of various obstructions to movement of the tractor. Longitudinal shifting of the lift arm and shovel may also be utilized to increase the dumping height of the shovel structure so as to provide additional utility to the material handling apparatus.

It is, therefore, a principal object of the present invention to provide a new and improved loading arrangement for a material handling apparatus of the type described.

A further object of the invention is to provide a material handling apparatus of the type described having a material handling member which is shiftable into an extended position independently of movement of the tractor on which such member is mounted.

Another object of the invention is to provide a material handling apparatus which is relatively simple in construction, economical to manufacture and which is highly efficient in accomplishing its intended functions.

Other and further objects of the invention will be apparent from the following description and claims and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 2 is a rear elevational view of the apparatus disclosed in Fig. 1, with certain parts thereof broken away;

Fig. 3 is a fragmentary sectional view taken along lines 3—3 of Fig. 1;

Fig. 4 is a side elevational view, on a reduced scale, of the apparatus disclosed in Fig. 1, with the material handling member shown in its dumping position in solid lines and in a load transporting position in dash-dotted lines.

Figure 1:
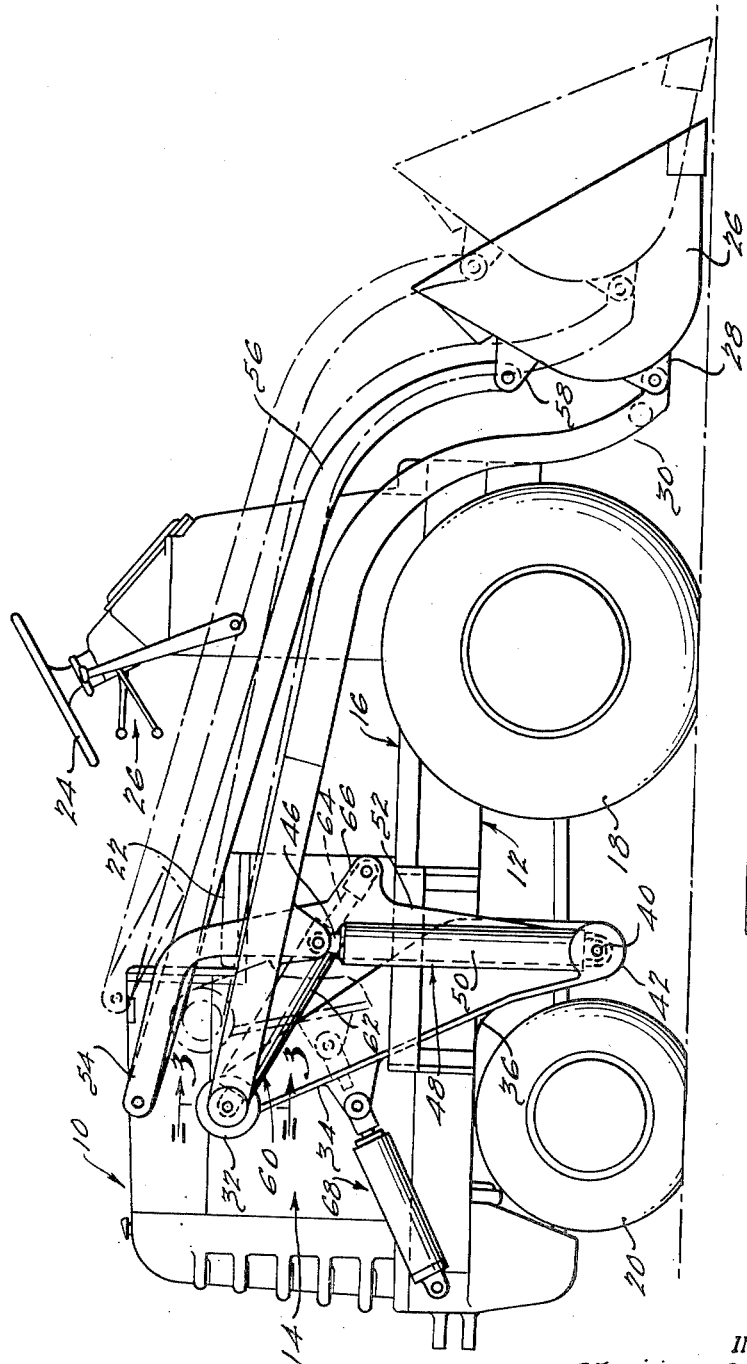
Fig. 1 is a side elevational view of a material handling apparatus embodying the present invention showing the material handling member in its normal loading position in solid lines and in its extended position in dash-dotted lines.

Referring more particularly to the drawings, the power operated tractor propelled material handling device of this invention may comprise a tractor indicated generally at 10, having a frame 12, an engine 14 mounted on the frame at the rear end thereof, a transmission 16 mounted on the other end of the frame and suitably connected to the engine 14, front drive wheels 18 driven from the transmission 16, rear wheels 20, operator's seat 22, a steering wheel 24, and control mechanism indicated generally at 26 for operating the material handling apparatus in a manner to be more fully described hereinafter.

The material handling member may comprise a shovel 26 or any other suitable material handling device. The shovel 26 is pivotally connected by means of brackets 28 to one end of a pair of lift arms 30, one of which is arranged at each side of the tractor 10. The lift arms 30 are pivotally connected at their inner ends to the upper ends 32 of supporting levers 34.

The frame 12 of the tractor includes at each side thereof a downwardly extending portion 36 which may be integral with frame 12 or suitably secured thereto. The lower ends of portions 36 of frame 12 are provided with suitable bearing means 38 having a supporting shaft 40 journaled therein and extending transversely of the frame below the body of the tractor. The lower ends 42 of supporting levers 34 are mounted on the outer ends of supporting shaft 40 and retained thereon by suitable means, such as bolts 44. The supporting levers 34 are pivotally mounted on supporting shaft 40.

Each lift arm 30 is pivotally connected to the piston member 46 of a hydraulic piston and cylinder means indicated generally at 48 and including a cylinder member 50 which is pivotally supported on shaft 40. Cylinders 50 of the hydraulic means 48 are suitably connected by fluid connections (not shown) to a hydraulic pressure system for simultaneous actuation of such hydraulic means by one of the control levers indicated generally at 26. The hydraulic means 48 are operable for pivoting lift arms 30 about their pivotal connections with the upper ends 32 of supporting levers 34 for moving shovel 26 into a desired elevation.

A means is provided for controlling the angular position of the shovel 26 on the end of lift arms 30 and may comprise a tilting lever 52 at each side of the tractor having their lower ends pivotally mounted on shaft 40 inwardly of the pivotal connection of cylinders 50 of hydraulic means 48 with shaft 40.

The upper ends 54 of tilting levers 52 extend rearwardly and at their extremities are pivotally connected to the inner ends of link members 56, the outer ends of link members 56 being pivotally connected to the shovel 26 by means of brackets 58. Pivotal movement of tilting levers 52 about their connection with supporting shaft 40 will effect shifting of link arms 56 in such a manner as to adjust the angular position or tilting of shovel 26 relative to lift arms 30. Hydraulic means indicated generally at 60 are provided for effecting pivotal movement of tilting levers 52 and each hydraulic means 60 may comprise a cylinder member 62 pivotally mounted on the upper end 32 of a supporting lever 34 and a piston member 64 pivotally connected to a laterally extending arm 66 provided on a tilting lever 52. The hydraulic means 60 may also be suitably connected to the hydraulic system and arranged for simultaneous actuation by one of the control levers indicated at 26.

The arrangement described above permits raising and lowering of lift arms 30 and shovel 26 between loading, transporting and dumping positions of the shovel 26, while actuation of tilting levers 52 by their hydraulic means 60 is operable to adjust the angular position of the shovel on the end of the lift arms 30.

The shovel 26 and lift arms 30 are shown in Fig. 1 in their normal lowered digging or loading position in solid lines. With the shovel in loading position, the tractor may be driven toward the material to be handled and shovel 26 will dig into the material to be handled. A means is provided for effecting longitudinal shifting of the shovel into the material to be handled independently of movement of the tractor after the tractor has been driven forwardly as far as possible to effect the loading operation.

Such means comprises hydraulic piston and cylinder means 68, the piston member of each of which is pivotally connected to an intermediate portion of a supporting lever 34 and the cylinder member of each of which is pivotally mounted on the frame 12 of the tractor. The hydraulic means 68 are also arranged for simultaneous actuation by one of the control levers indicated at 26 and extension of the hydraulic piston and cylinder means 68 is operable to pivot supporting levers 34 about shaft 40 which thereby effects longitudinal shifting of lift arms 30 and shovel 26 to thrust the shovel further into the material to be handled and completely load the same. The shovel 26 may thereafter be tilted into its load carrying position by actuation of hydraulic means 60 in such manner as to effect a rearward shifting of link members 56 relative to lift arms 30. Hydraulic means 48 may then be actuated to raise lift arms 30 and the shovel into a load transporting position of the latter in which the shovel may be arranged below the level of the steering wheel to provide vision over the shovel or in which the shovel may be raised into its uppermost position illustrated in dotted lines in Fig. 4 to provide clearance below the shovel for vision ahead of the tractor. The dumping operation of the shovel is accomplished by extension of hydraulic means 60 to pivot tilting levers 52 about shaft 40 in the manner shown in Fig. 4, after which the various hydraulic means may be actuated to return the shovel structure to its transporting position or to the loading position thereof.

Since tilting levers 52 are connected to supporting levers 34 by means of the hydraulic piston and cylinder means 60, pivotal movement of supporting levers 34 upon actuation of hydraulic means 68 to effect a digging thrust of the shovel 26, will effect pivotal movement of tilting levers 52 with supporting levers 34 to effect longitudinal shifting of links 56 with lift arms 30 and thereby maintain the angular relation of the shovel 26 and lift arms 30 during shifting of the same.

It will thus be seen that the provision of lift arms 30 which are pivotally connected to the upper ends of supporting levers 34 pivotally mounted on the frame of the tractor, and hydraulic means 68, provides an arrangement in which digging movement of the shovel 26 may be accomplished independently of movement of the tractor. This arrangement has additional utility in that hydraulic means 68 may be actuated when the shovel is raised to its uppermost position to thereby raise the shovel to a height not otherwise possible to attain, so as to provide a greater dumping height for the shovel than would otherwise be possible.

Certain of the subject matter disclosed herein is disclosed and claimed in my prior copending application Serial No. 242,095, filed August 16, 1951, for "Tractor Shovel."

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In a material handling apparatus for use with an engine driven vehicle, a supporting lever pivotally connected at one end to said vehicle, a lift arm pivotally connected at its inner end to the other end of said supporting lever, a material handling member mounted on the outer end of said lift arm, actuating means connected to said vehicle and to an intermediate portion of said lift arm and operable for raising and lowering said lift arm and material handling member between a transporting position and a loading position of said member, said lift arm extending lengthwise of the vehicle when in loading position whereby pivoting of said supporting lever effects substantial longitudinal shifting of said lift arm, and actuating means connected to said vehicle and to said supporting lever operable for pivoting said supporting lever about its connection with said vehicle to thereby effect longitudinal shifting of said lift arm and said member independently of movement of said vehicle.

2. In a material handling apparatus for use with a vehicle, a supporting lever pivotally mounted on said vehicle on a horizontal axis, a lift arm pivotally connected to said supporting lever, a material handling member rockingly mounted on said lift arm, actuating means connected to said lift arm and operable for pivoting said arm on said supporting lever for raising and lowering said lift arm and material handling member, a tilting lever pivotally connected to said vehicle on said horizontal axis, a link member extending generally parallel to said lift arm and pivoted to said tilting lever and to said material handling member, actuating means reacting between said supporting lever and said tilting lever and operable for pivoting said tilting lever to shift said link to adjust the angular position of said material handling member on said lift arm, and actuating means connected to said vehicle and to said supporting lever and operable for pivoting said supporting lever and said tilting lever about said horizontal axis to effect shifting of said lift arm and link in the direction of their lengths and consequent movement of said material handling member without substantial change in its angular position relative to said lift arm.

3. In a material handling apparatus for use with an engine driven vehicle, a supporting lever pivotally mounted on said vehicle, a lift arm pivotally connected to said supporting lever, a material handling member rockingly mounted on said lift arm, actuating means connected to said lift arm and operable for raising and lowering said lift arm and material handling member between a transporting position and a loading position of the latter, in which latter position said member may be moved into contact with the material to be handled upon movement of said vehicle, a tilting lever pivotally connected to said vehicle, a link member pivoted to said tilting lever and to said material handling member, actuating means connected to said tilting lever and operable to pivot the same and thereby shift said link member to adjust the angular position of said material handling member on said lift arm, and actuating means connected to said vehicle and to said supporting lever and operable for pivoting said supporting lever about its connection with said vehicle to thereby effect longitudinal shifting of said lift arm and said material handling member independently of movement of said vehicle, said tilting lever being pivoted with said supporting lever in response to pivotal movement of the latter by its actuating means to effect longitudinal shifting of said link with said lift arm.

References Cited in the file of this patent

UNITED STATES PATENTS

| | | |
|---|---|---|
| 1,371,344 | Brackett | Mar. 15, 1921 |
| 2,413,096 | Barker | Dec. 24, 1946 |
| 2,538,000 | Hoar et al. | Jan. 16, 1951 |
| 2,600,739 | Dempster | June 17, 1952 |
| 2,603,374 | McNamara, Jr. | July 15, 1952 |